United States Patent [19]

Weisburn et al.

[11] Patent Number: 5,597,068

[45] Date of Patent: Jan. 28, 1997

[54] COMPACT DISC SECURITY CONTAINER

[75] Inventors: James T. Weisburn, Massillon; Ronald K. Burdett, Strasburg, both of Ohio

[73] Assignee: Alpha Enterprises, Inc., North Canton, Ohio

[21] Appl. No.: 519,360

[22] Filed: Aug. 25, 1995

[51] Int. Cl.$^6$ .................................................. B65D 85/57
[52] U.S. Cl. .................................. 206/308.1; 206/307.1; 206/309; 206/387.14
[58] Field of Search ............................... 206/307, 307.1, 206/308.1, 308.2, 308.3, 309–310, 312, 387.11, 425, 472, 473, 387.14

[56] References Cited

U.S. PATENT DOCUMENTS

| | | | |
|---|---|---|---|
| 4,707,247 | 11/1987 | Savoy | 206/307.1 |
| 4,793,477 | 12/1988 | Manning et al. | 206/232 |
| 4,875,743 | 10/1989 | Gelardi et al. | 206/308.1 |
| 4,951,814 | 8/1990 | Belmont | 206/387.14 |
| 5,201,414 | 4/1993 | Kaszubinski | 206/309 |
| 5,207,717 | 5/1993 | Manning | 206/307.1 |
| 5,285,893 | 2/1994 | Misterka et al. | 206/310 |
| 5,293,995 | 3/1994 | Iwaki et al. | 206/308.3 |
| 5,375,712 | 12/1994 | Weisburn | 206/387 |
| 5,394,981 | 3/1995 | Cameron | 206/312 |
| 5,415,291 | 5/1995 | Fukagawa | 206/309 |
| 5,477,960 | 12/1995 | Chen | 206/309 |
| 5,495,940 | 3/1996 | Taniyama | 206/308.1 |

*Primary Examiner*—Bryon P. Gehman
*Assistant Examiner*—Luan K. Bui
*Attorney, Agent, or Firm*—Sand & Sebolt

[57] ABSTRACT

A security container for storing various articles is formed of transparent plastic material and has four tabs extending from a bottom wall with latching flanges extending from the ends of each tab. The flanges are positioned to be inserted into the four openings formed in the side walls of most jewel boxes for the storage of compact discs, removably securing the jewel box to the bottom wall of the container and allowing the jewel box to be opened and the compact disc to be accessed while the jewel box remains secured to the container by the flanges. A holder with a U-shaped opening for receiving at least one or two compact discs is removably secured to the inside surface of a double hinge panel of the container and holds the compact discs for display through a front wall of the security container. A locking mechanism secures the contents of the container while allowing the articles to be displayed through the container walls. An E.A.S. tag also may be secured inside the container or the locking mechanism to prevent unauthorized removal of the container and contents from a retail store.

17 Claims, 4 Drawing Sheets

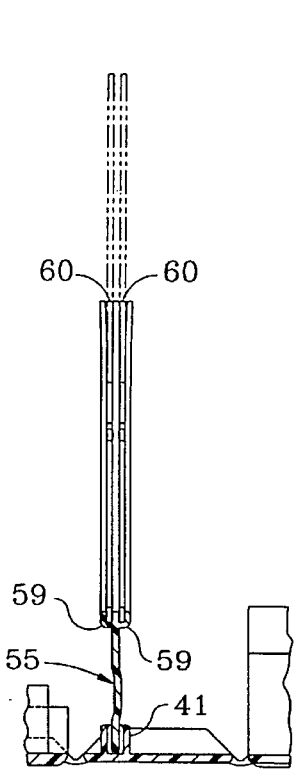
FIG. 4
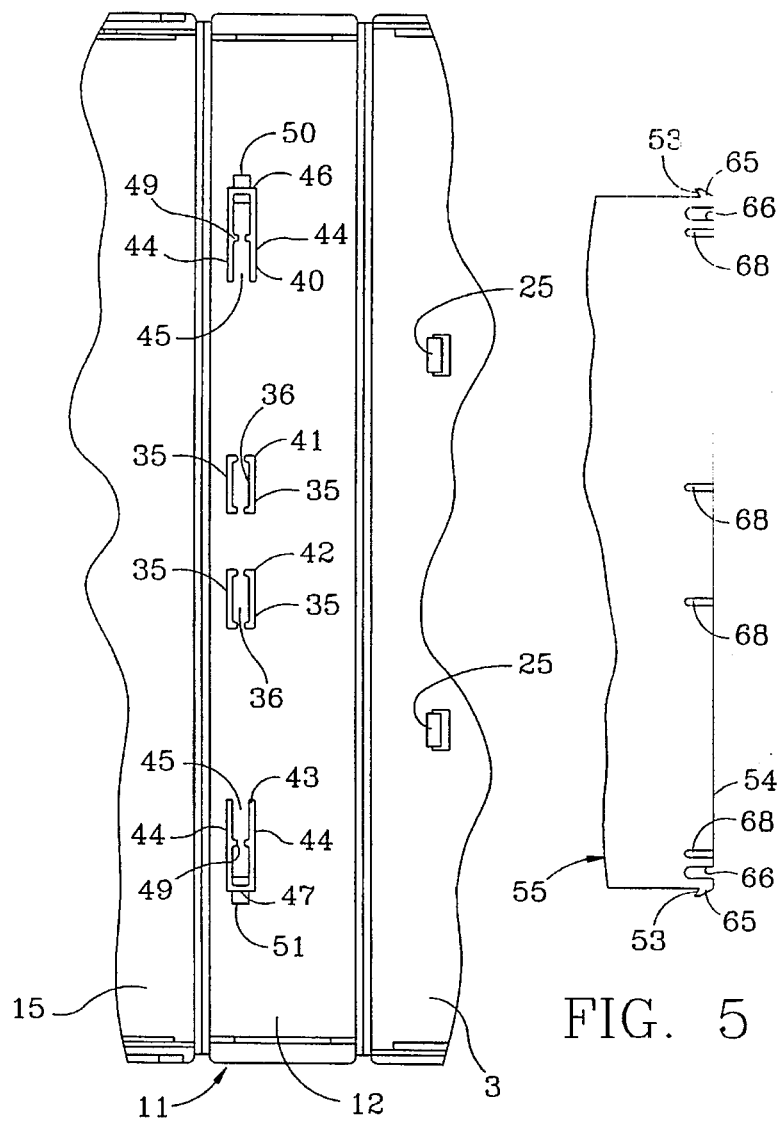
FIG. 3
FIG. 5
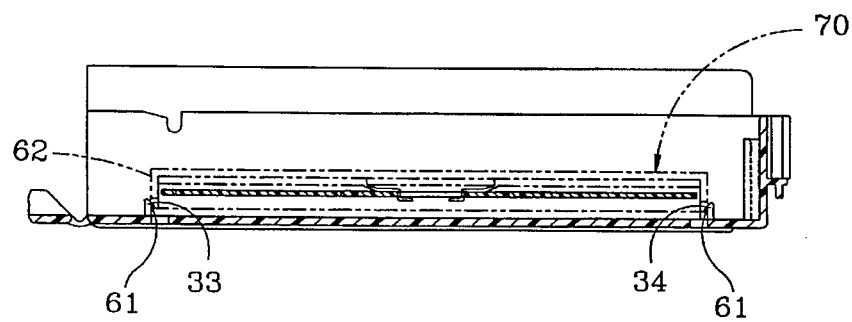
FIG. 6

COMPACT DISC SECURITY CONTAINER

BACKGROUND OF THE INVENTION

1. Technical Field

The invention relates to containers and in particular, to a container for storing various articles including video tapes, CD audios, CD ROMs (compact discs) etc. and their respective jewel boxes, and similar data storage articles. More particularly, the invention relates to such a storage container which secures the compact disc and jewel box preventing unauthorized removal, loss and damage, yet allows both the compact disc and jewel box to be displayed through a base and cover of the storage container.

2. Background Information

The emergence of the compact disc (CD) as a preferred data storage medium has led to difficulties in protecting and storing CDs and their respective jewel boxes both in the retail market and in the rental market. CDs are used as a data storage medium in many different industries, for example the music industry uses CDs to store and play albums, the video game industry uses CDs to store and play games, and the computer industry uses CDs to store software for multimedia applications.

CD rentals have become increasingly popular because of the relatively high retail price of certain types of CDs. One problem rental stores have with CD rentals is the loss or destruction of the jewel box while the CD is in the possession of a renter. While the renter is using the CD they are often unconcerned with what happens to the jewel box. Consequently the jewel box is often lost or damaged.

The present invention affixes the jewel box to the inside of the container allowing for removal of the CD for use while protecting the jewel box from loss or damage. The storage container is constructed from a transparent material which allows the graphics within the jewel box to be read by the renter.

The loss and damage of directions which accompany video games and software is another problem of rental stores. The storage container of the present invention allows the directions to be secured and displayed within the jewel box making removal of the directions unnecessary.

When CDs are stored in their jewel boxes they are relatively small in size. The price of CDs as compared to other recording mediums is relatively high. These among other factors make CDs conducive to unauthorized removals from retail stores.

One current anti-theft technique includes enclosing the CD and jewel box in a cardboard or plastic container to enlarge the total CD package size and make unauthorized removal from the retail store more difficult. The container of the present invention preferably includes a locking mechanism, such as that shown in prior art U.S. Pat. No. 5,375,712, which assures that the CD will not be removed from the CD storage container without prior approval from authorized store personnel. The enclosure of an E.A.S. tag (electronic article surveillance) within the CD storage container or within the locking mechanism further assures that the CD storage container itself will not be removed from the store without prior approval from authorized store personnel.

Another anti-theft technique used by retail stores is to remove the CD from the jewel box prior to display. The jewel box is then displayed empty and the corresponding CD is kept behind the store counter. This technique requires a second jewel box for every CD in the stores inventory and requires an additional storage space to store the CD. When the consumer decides to purchase a CD, the consumer must give the empty jewel box to the store employee. The store employee must then find the corresponding CD from among all of the CDs in the store's inventory. The CDs while behind the counter must be stored in a second jewel box to protect the CD from dirt and damage. The retail store is not only required to stock an additional jewel box for every CD in inventory, but must also have additional storage space to keep the CDs in while the empty jewel boxes are on display.

Therefore, the need exists for an improved storage container, preferably formed of an inexpensive lightweight transparent plastic, which allows for visibility to both the CD and its respective jewel box, which affixes the jewel box to the side of the container to prevent loss or damage yet allows for the display of graphics or directions, which container is capable of storing a variety of articles such as a CD and jewel box, or a video or audio cassette tape, which can be reused indefinitely which is relatively small in size, yet sufficiently large to retard theft, which can be secured with a locking device, and which allows for an E.A.S. tag to be attached inside the container or locking mechanism to restrict unauthorized removal of the CD or video tape from the retail store. There is no such storage container of which we are aware which accomplishes these results.

SUMMARY OF THE INVENTION

Objectives of the invention include providing an improved security container which is formed of a transparent, lightweight molded plastic, which can be mass produced relatively inexpensively, and which allows for visibility to both the CD and its respective jewel box.

Another objective of the invention is to provide such a security container which affixes a CD jewel box to the inside of the container to prevent loss and damage and allows for the display of graphics or directions.

A still further objective of the invention is to provide such a security container which is versatile in that it provides for the safe storage of a variety of articles such as a CD and jewel box, or a video or audio cassette tape.

Another objective of the invention is to provide such a security container which may be secured with a locking mechanism that can be opened only by authorized personnel.

Still another objective of the invention is to provide such a security container which may be reused indefinitely.

A further objective of the invention is to provide such a security container in which an E.A.S. tag may be attached to the inside surface of the container or to the inside surface of the locking mechanism, whereby such E.A.S. tag will prevent unauthorized removal of the security container from the store until a store clerk unlocks the security container, removes the CD and jewel box, and authorizes the removal of the CD and jewel box from the store.

These objectives and advantages are obtained by the container of the present invention the general nature of which may be stated as including a base and a cover hingedly connected to one another by an elongated rectangular-shaped hinge panel for movement between open and closed positions; first attachment means formed on the base of the container for attaching a jewel box to said base; a holder for holding at least one disc-shaped data storage medium; and second attachment means formed on the hinge panel for mounting the holder on said panel.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is a fragmentary top plan view of the hinge panel with the CD holder removed;

FIG. 4 is a fragmentary sectional view of the hinge panel taken on line 4—4, FIG. 1, showing the CD holder holding two CDs shown in dot dash lines;

FIG. 5 is a fragmentary plan view of the bottom edge of the CD holder removed from the security container;

FIG. 6 is a fragmentary sectional view taken on line 6—6, FIG. 1, with a jewel box shown in dot dash lines, and an enclosed CD shown in section in the jewel box;

Similar numbers refer to similar parts throughout the drawings.

DESCRIPTION OF THE PREFERRED EMBODIMENT

Figure 1:
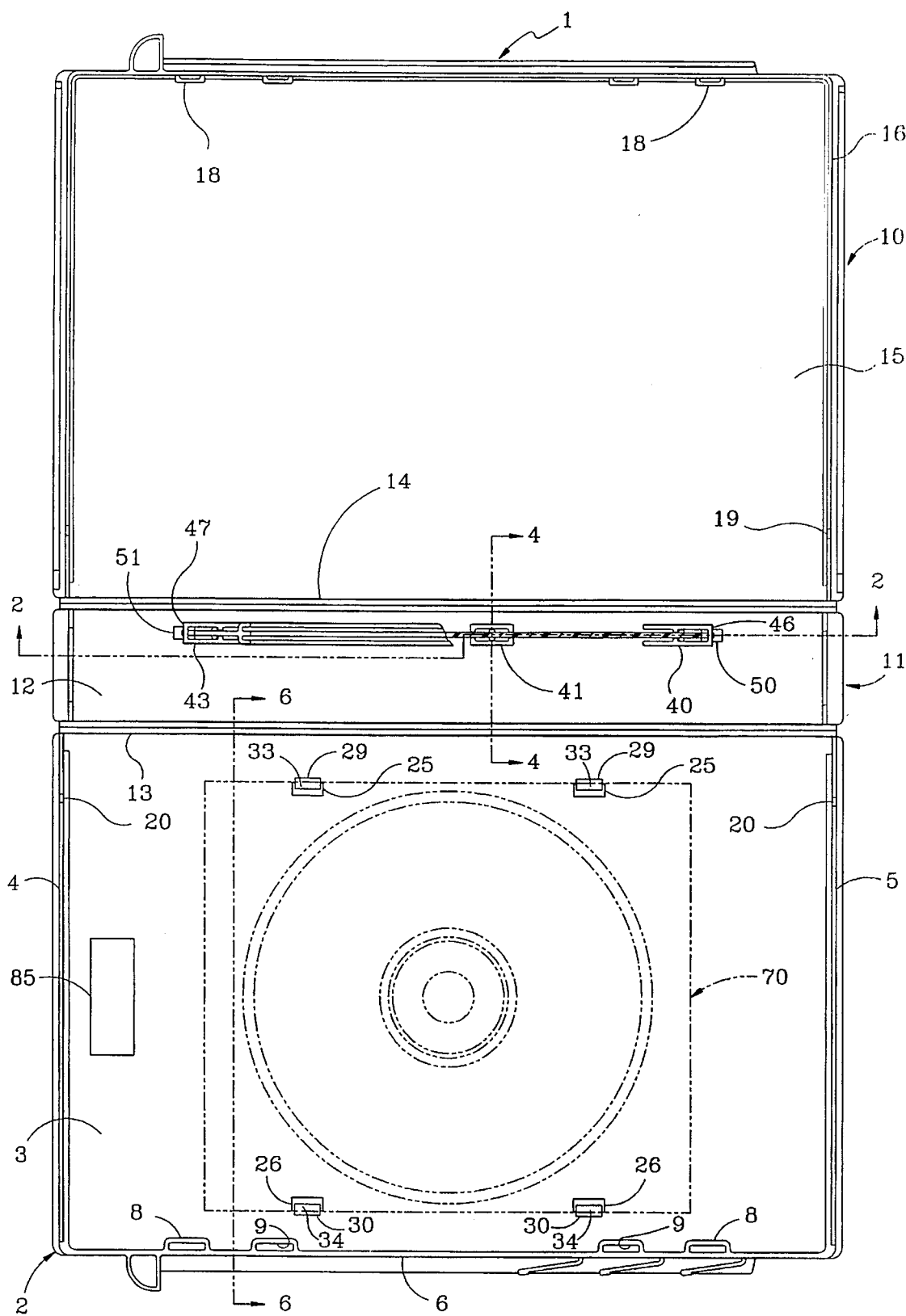
FIG. 1 is a top plan view of the compact disc security container in full open position.
Figure 2:
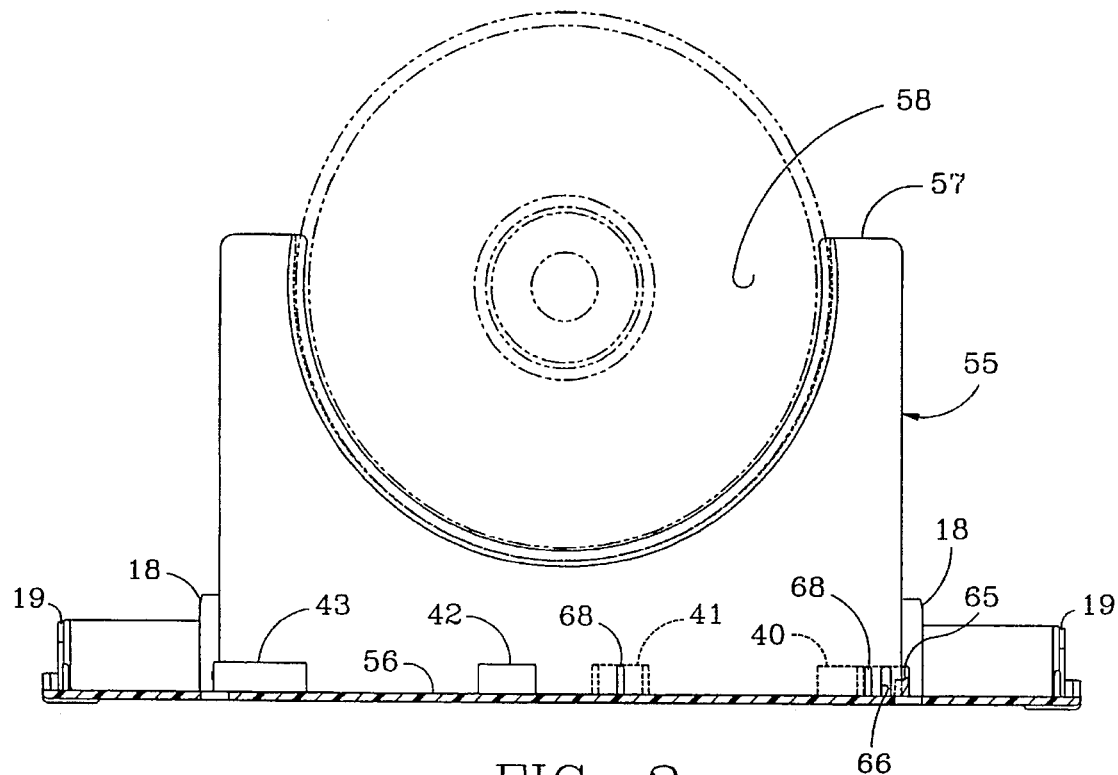
FIG. 2 is a sectional view taken along line 2—2, FIG. 1, with a CD shown in dot dash lines.
Figure 7:
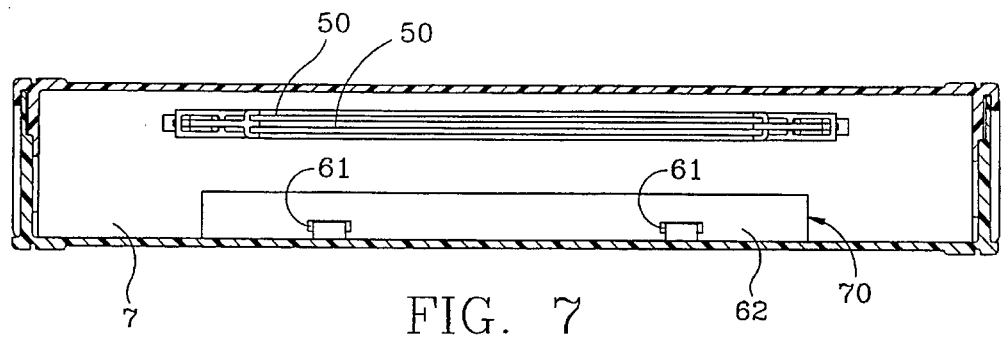
FIG. 7 is a sectional view of the security storage container shown in a closed position and with the CD holder and jewel box shown in full lines enclosed.

The storage container of the present invention is indicated generally at 1, and is shown in FIG. 1 in a full open position. Container 1 has a rectangular box-shaped configuration and forms a hollow storage compartment 7 when closed, as shown in FIG. 7. Container 1 preferably is molded of a transparent plastic material, such as polypropylene. Container 1 includes a three-sided base indicated generally at 2, having a rectangular-shaped flat bottom wall 3 with upstanding parallel end walls 4 and 5 and a front wall 6. Walls 4, 5, and 6 are formed integrally with bottom wall 3 and are arranged in a U-shaped configuration to enclose three sides of bottom wall 3. Walls 4 and 5 preferably are positioned inwardly a short distance from the outer edge of bottom wall 3. Two pairs of tab receiving hollow members 8 are formed on the inner surface of front wall 6 and are provided with top openings 9.

A flat rectangular-shaped cover or lid indicated generally at 10, is hingedly movably mounted on base 2 by a double hinge panel assembly indicated generally at 11. Hinged panel assembly 11 includes an elongated rectangular-shaped panel 12 formed of plastic material, which is connected to the inner edges of base 2 end cover 10 by living hinges 13 and 14, respectively. Cover 10 includes a flat rectangular-shaped top closure wall 15, similar in size and configuration to bottom wall 3. A U-shaped flange 16 is formed integrally with top wall 15 and projects outwardly from the inside surface thereof and preferably is spaced a short distance inwardly from the outer edges of the top wall and extends about three sides of wall 15.

Two pairs of spaced tabs 18 are formed on an inside surface of the central portion of flange 16 and are adapted to fictionally engage tab receiving members 8 when inserted through openings 9 thereof, to secure cover 10 in a closed position on base 2 as shown in FIG. 7. A pair of guide tabs 19 also may be formed on the sides of flange 16 and are received within U-shaped notches 20 formed in end walls 4 and 5 of base 2, when the cover is in the closed position.

In accordance with one of the features of the present invention, two pairs of rectangular shaped slots 25 and 26 are formed in base 3 to permit the molding of a first attachment means. The first attachment means includes two pairs of upstanding integrally formed flexible tabs 29 and 30 which project orthogonally from bottom wall 3 into storage compartment 7 of container 1, adjacent to slots 25 and 26, respectively. Tabs 29 and 30 are formed in a rectangular pattern on base wall 3 and include inwardly extending latching flanges 33 and 34, respectively, (FIGS. 1, 6 and 8) which are integrally formed on the end of the tabs.

In further accordance with the invention, a second attachment means which includes four outwardly extending receptacles 40, 41, 42, and 43 (FIGS. 2, 3, 4 and 8) are formed integrally on an inside surface of hinge panel 12. The outer edges of end receptacles 40 and 43 have closed ends 46 and 47 (FIGS. 1, 3, and 8), respectively, which extend partially toward hinge panel 12 and form lower openings 48 (FIG. 8) adjacent panel 12. Panel 12 has two rectangular shaped holes 50 and 51 (FIGS. 1 and 4) formed beneath closed ends 46 and 47 of end receptacles 40 and 43, respectively. Receptacles 40 and 43 also include a pair of spaced parallel walls 44 which form a U-shaped opening 45 therebetween. A pair of spaced nubs 49 extend along walls 44 within openings 45. Receptacles 41 and 42 are each formed by a pair of spaced parallel walls 35 which form opening 36 therebetween.

A holder for holding at least one, and preferably two, disc-shaped data storage media (compact discs) is indicated generally at 55 (FIG. 2, 4 and 8), and is removably inserted into receptacles 40–43. Holder 55 has a rectangular shape and is formed with a U-shaped top opening 58. A pair of U-shaped flanges 59 (FIGS. 4 and 8) are formed integrally with and adjacent to opening 58. Flanges 59 form a pair of U-shaped grooves 60 (FIGS. 4 and 8) which extend along the inside of opening 58 for receiving two disc-shaped data storage media therein. Opening 58 and U-shaped grooves 60 have a substantially semicircular configuration with a diameter width just slightly smaller than the diameter of a usual disc-shaped data storage media such as a CD-audio or CD-ROM, whereby U-shaped grooves 60 slidably receive and frictionally retain the disc-shaped data storage media therein, as shown in dot-dashed lines in FIGS. 2, 4 and 8.

Referring to FIG. 5, holder 55 has two fastening tabs 65 formed on each end of a bottom edge 54 which have latching shoulders 53 that extend from the side of the tabs and lock under closed ends 46 and 47 of receptacles 40 and 43 to removably mount holder 55 on hinge panel 12. A pair of notches 66 are formed in bottom edge 54 of holder 55 adjacent to fastening tabs 65. Notches 66 allow tabs 65 to be flexed inwardly allowing latching shoulders 53 to pass through holes 50 and 51 and snap into engagement with panel 12 to secure holder 55 on hinge panel 12. Closed ends 46 and 47 of receptacles 40 and 43 cooperate with notches 66 to assist the retention of holder 55 in receptacles 40 and 43. Each side of holder 55 adjacent bottom edge 54, includes four integrally formed guides 68 extending upwardly a short distance from the bottom edge which are slidably inserted between the spaced walls of receptacles 40–43 and fictionally secure and stabilize holder 55 on hinge panel 12.

Figure 8:
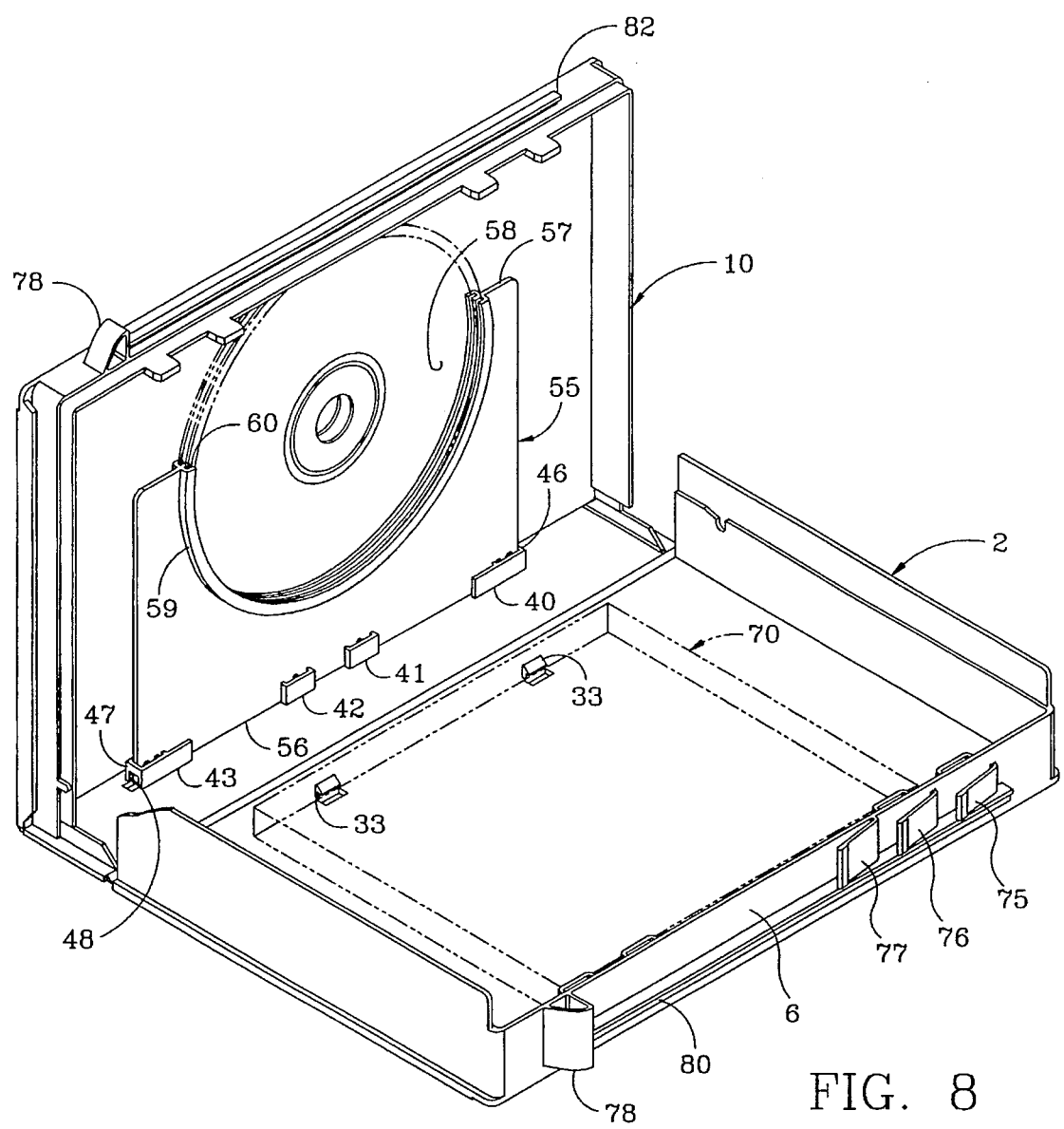
FIG. 8 is a perspective view of the security container in a partially open position with two CDs and a jewel box shown in dot dash lines enclosed.

As shown in FIGS. 7 and 8, holder 55 includes a generally flat panel and, when mounted on hinge panel 12, extends substantially parallel with and spaced from top wall 15 of cover 10, which provides a space for receiving graphics (not shown) in a stored position therebetween.

In accordance with another of the features of the invention, a usual CD storage box, referred to in the music industry as a jewel box, indicated at 70 (FIGS. 1, 6, 7 and 8) is removably mounted and secured on bottom wall 3 by latching flanges 33 and 34 of tabs 29 and 30 being snap-fitted into the four slots 61 (FIGS. 6 and 7) formed in the side walls 62 of most commercial jewel boxes. Slots 61 are formed when molding graphic holding tabs on the inside of the jewel box closure lid. Thus a usual jewel box 70 is secured adjacent bottom wall 3 enabling the jewel box to be pivotally opened allowing access to the enclosed CD and graphics while jewel box 70 remains secured to container 1 preventing its loss.

Figure 9:
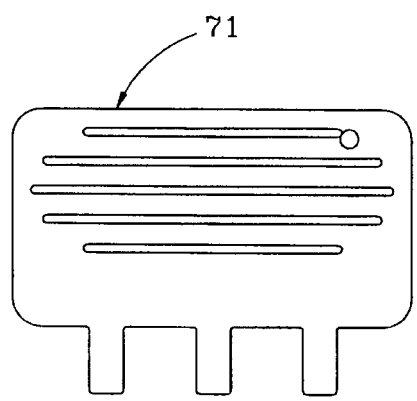
FIG. 9 is a plan view of one type of unlocking key for the security container of the present invention.
Figure 10:
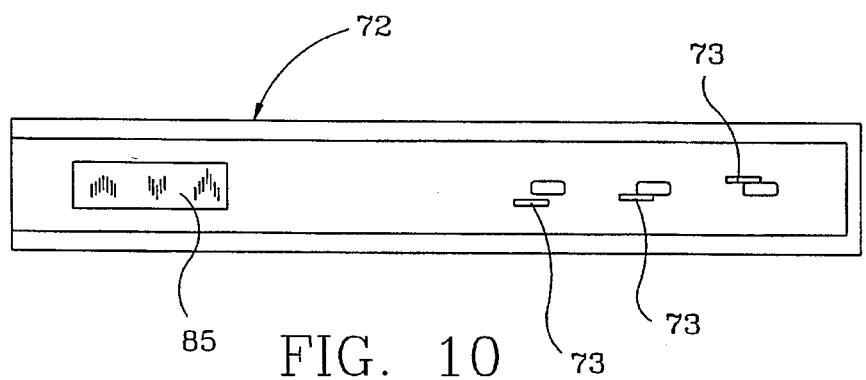
FIG. 10 is a plan view of the prior art slide lock for securing the container in a locked position.

Hinge panel assembly 11 provides for movement of container lid 10 between open and closed positions. Preferably container 1 is provided with a locking mechanism to secure cover 10 and base 2 in a closed locked position and prevent unauthorized opening of the container and removal of the contents therefrom as shown in FIG. 7. The particular locking mechanism which is shown in the drawings is similar to that of U.S. Pat. No. 5,375,712 and includes a plurality of flexible tabs 75, 76 and 77 and a stop 78 (FIG. 8) integrally formed on front wall 6 of container 1. A slide latch 72 (FIG. 10) has a plurality of locking projections 73 which correspond to flexible tabs 75–77 and slides along L-shaped members 80 and 82 which are formed on base 2 and cover 10, respectively, until the slide latch abuts stop 78 (FIG. 8). Flexible tabs 75–77 and locking projections 73 prevent removal of the slide latch until it is unlocked with a usual key 71, as shown in FIG. 9. A usual E.A.S. tag 85 (FIGS. 1 and 10) may be adhered to the inside of either container 1 or to an inside surface of the slide lock to prevent unauthorized removal of container 1 and its contents from the retail store.

Jewel box 70 is snap fitted easily in container 1 by tabs 29 and 30 and retains a CD secured in container 1. Jewel box 70 is displayed through transparent bottom wall 3 enabling the graphics or a CD contained thereon to be viewed easily by a purchaser or renter of the CD. Holder 55 holds one or two CDs such that their contents also are displayed through transparent front wall 6. Container 1 may be opened and one or both CDs may be removed from holder 55 or from jewel box 70. Jewel box 70 may also be removed from bottom wall 3 by bending bottom wall 3 along walls 4 and 5 thus retracting latching flanges 33 and 34 from the openings 61 formed in the side walls of jewel box 70. Container 1 may be reused by the retail store by securing another CD and jewel box therein as described above.

In accordance with another feature of the invention, the CD may be easily remove during rentals by opening the jewel box while still secured to bottom wall 3 and removing the CD. There is no need for the renter to remove the jewel box from container 1 subjecting the jewel box to loss or damage. Likewise the instruction sheets for a game recorded on the enclosed CD will remain secured in the jewel box.

In accordance with another feature of the invention, container 1 is molded with receptacles 40–43 integrally formed in hinge panel 12. Holder 55 is molded separately from container 1 and is removably snap-fit mounted into receptacles 40–43. When holder 55 is attached to panel 12, the inserted CD is suspended in the container preventing the CD from contacting the jewel box or the sides of the container as shown in FIG. 7. When holder 55 and jewel box 70 are removed from panel 12, container 1 may be used to store other articles such as video tapes, audio tapes or video game cartridges.

Accordingly, the security container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the compact disc security container is constructed and used, the characteristics of the construction, and the advantageous, new and useful results obtained; the new and useful structures devices, elements, arrangements, parts and combinations, are set forth in the appended claims.

We claim:

1. A container for displaying and storing a disc-shaped data storage medium and a jewel box, said container including:

a base and a cover hingedly connected to one another by a hinge panel for movement between open and closed positions, said base and cover forming a storage compartment;

first attachment means formed on the base of the container for attaching the jewel box to said base, said first attachment means including a plurality of spaced flexible retaining tabs formed on the base for snap-fitting into holes formed in the jewel box for removably mounting the jewel box on the container base, wherein each of the tabs have a latching flange for engagement with the jewel box;

a holder including a generally flat panel formed with at least one substantially U-shaped groove for slidable receiving and retaining at least one disc-shaped data storage medium, said panel extending generally parallel to and spaced from the cover and forming a graphics storage space therebetween; and second attachment means formed on the hinge panel for mounting the holder panel on said hinge panel.

2. The container defined in claim 1 including lock means for locking the cover and base in the closed position.

3. The container defined in claim 1 in which four of the flexible tabs are formed on the base in a rectangular pattern.

4. The container defined in claim 1 in which two U-shaped grooves are formed in the holder panel for receiving two disc-shaped data storage media therein.

5. The container defined in claim 4 in which each of the U-shaped grooves has a substantially semicircular configuration.

6. The container defined in claim 1 in which the second attachment means includes a plurality of outwardly extending receptacles formed on the hinge panel; and in which the holder panel includes tabs formed adjacent a bottom edge thereof for removably mounting said holder panel to said receptacles.

7. The container defined in claim 6 in which certain of the receptacles include a pair of spaced walls; and in which guides are formed on the holder panel and are slidably insertable between said spaced walls.

8. The container defined in claim 1 in which an E.A.S. tag is mounted within the storage compartment.

9. The container defined in claim 1 in which the base, cover and hinge panel are formed as a one-piece member of transparent plastic material.

10. In combination, a box for holding an article and a container for holding and displaying the box and a disc-shaped data storage medium, said combination including:

a base and a cover hingedly connected to one another by a hinge panel for movement between open and closed positions, said base and cover forming a storage compartment;

first attachment means formed on the base of the container for attaching the box to said base;

a holder for holding at least one of said disc-shaped data storage medium; and second attachment means formed on the hinge panel for mounting the holder on said hinge panel; said box having a pair of side walls with openings formed therein and a closure lid pivotally mounted with respect to said side walls; said first attachment means includes a plurality of spaced flexible retaining tabs formed on the base for snap-fitting into the openings formed in the box side walls for removably mounting the box on the container base and for permitting the closure lid to be pivotally moved between open and closed positions when said box is mounted on the base.

11. The combination defined in claim 10 in which each of the tabs includes a latching flange which extends into the openings of the box for securing said box on the base of the container.

12. The combination defined in claim 10 in which the holder includes a generally flat panel formed with at least one substantially U-shaped groove for slidably receiving and retaining the disc-shaped data storage medium therein.

13. The combination defined in claim 12 in which the holder is formed with a U-shaped opening; and in which two of the U-shaped grooves are formed adjacent said opening for receiving two disc-shaped storage media therein.

14. The combination defined in claim 13 in which the U-shaped opening and the pair of U-shaped grooves have a substantially semicircular configuration.

15. The combination defined in claim 10 in which the second attachment means includes a plurality of outwardly extending receptacles formed on the hinge panel; and in which the holder includes tabs adjacent a bottom edge thereof for removably mounting said holder to said receptacles.

16. The combination defined in claim 10 in which the hinge panel includes an elongated rectangular member and a pair of living hinges connecting said member to the base and cover.

17. The combination defined in claim 10 in which the holder includes a generally flat panel which extends generally parallel to and spaced from the cover and forms a graphics storage space therebetween when the cover is in the closed position.

* * * * *